Patented Aug. 27, 1940

2,213,128

UNITED STATES PATENT OFFICE 2,213,128

ALKALINE STORAGE BATTERY

Erich Langguth, Hagen-Emst, Germany, assignor to Accumulatoren-Fabrik Aktiengesellschaft, Berlin, Germany, a joint-stock company of Germany No Drawing. Application September 21, 1936, Serial No. 101,820. In Germany February 13, 1935

2 Claims. (Cl. 136—24)

My invention relates to improvements in alkaline storage batteries, and more particularly in batteries of the type in which the negative electrode consists of a porous carrier made from sintered metal powder, and active mass. In batteries of this type such as are now in use the carrier forming a part of the negative electrode consists exclusively of sintered iron particles. Such negative electrodes are objectionable for the reason that the iron is activated by reason of its large surface and thereby the carrier loses its strength by repeated discharges, that the activated plates containing iron have a high self-discharge, and that the charging and discharging curves characteristic to the iron are maintained even if the active mass contains cadmium. I have discovered that these objections are avoided when the carrier of the negative electrode is not made from iron, but from powdered and sintered copper or nickel or a mixture of copper and nickel.

My improved electrodes may be manufactured according to any of the known methods heretofore used in the manufacture of similar negative electrodes having a porous carrier of sintered iron. Thus I may proceed as follows:

Powdered copper or nickel or copper and nickel are sintered into a porous moulded body, and as an active mass cadmium and iron are applied to the said porous body, for example by causing the said porous body to absorb a solution of cadmium or cadmium and iron salt in ferrous form, for example cadmium chloride and ferrous chloride, and activating the plates by passing electric current therethrough in an alkaline solution as a negative electrode. The hydrogen which is thus developed has sufficient excess pressure for reducing the metallic hydroxides formed from the metal salts and alkali to electroactive metal. After this reduction to metal the alkali chlorides are completely washed from the plates.

Porous negative electrodes in which the porous carrier is composed of the said metal copper or nickel or copper and nickel have the property that when used as negative electrodes in alkaline batteries they do not chemically react with the electrolyte during charging and discharging. Cadmium and iron are applied to the pores of the carrier without the metal of the said carrier being attacked.

In such electrodes the cadmium contained in the said plates is not excited to self-discharge by the metal or metals copper and nickel from which the carrier is composed. Even iron is not excited to self-discharge. I have found that the carrier may be manufactured at lowest cost when it consists exclusively of copper. Such electrodes in which the carrier consists only of copper have particularly good conductivity, while the presence of nickel in the carrier considerably reduces the conductivity of the sintered body. Such electrodes in which the carrier consists of copper are not attacked even when the plates temporarily project from the electrolyte, the reason being that by reason of the porous structure of the carrier the electrolyte rises within the projecting portion of the plate, and that upon oxidation of the copper the short-circuited local element cadmium-alkali-copper oxide is formed in which the copper is again reduced to metal.

If in such negative copper electrodes the negative composition is in excess, as is common use in the art, the electrode does not suffer injury when the poles are accidentally reversed.

These qualities also appear in the electrodes in which nickel to some extent replaces the copper.

By reason of the qualities described, negative electrodes provided with a porous carrier substance made of copper and nickel or one of these metals, after being impregnated with cadmium, are of considerable importance in connection with alkaline accumulators. By means for example of these negatives in combination with positives of known construction whose carrier substance is porous metallic nickel, accumulators are produced whose internal resistance is much lower than that of accumulators containing small tubes all of one size or pocket plates of known construction.

My improved negative electrode may be used in connection with a positive electrode of any composition heretofore used in alkaline storage batteries. But I prefer to use a positive electrode which consists of nickel oxide.

I claim:

1. The herein described storage battery, comprising an alkaline electrolyte free of metal, a positive electrode, and a negative electrode, the said negative electrode comprising a porous carrier consisting of sinistered copper powder, and an active mass of cadmium in elemental form permeating said porous carrier and exposed to the action of said electrolyte.

2. A storage battery as claimed in claim 1, in which the porous carrier consists of copper and nickel.

ERICH LANGGUTH.